(12) United States Patent
Liu et al.

(10) Patent No.: US 12,258,005 B2
(45) Date of Patent: Mar. 25, 2025

(54) SYSTEMS AND METHODS FOR VEHICLE HAZARDOUS CONDITION DETECTION

(71) Applicant: Polaris Industries Inc., Medina, MN (US)

(72) Inventors: Chiao George Liu, White Bear Lake, MN (US); Joseph P. Nuxoll, San Jose, CA (US); Jonathon P. Graus, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 163 days.

(21) Appl. No.: 17/506,204

(22) Filed: Oct. 20, 2021

(65) Prior Publication Data

US 2022/0118969 A1   Apr. 21, 2022

Related U.S. Application Data

(60) Provisional application No. 63/165,920, filed on Mar. 25, 2021, provisional application No. 63/093,819, filed on Oct. 20, 2020.

(51) Int. Cl.
 *B60W 30/08* (2012.01)
 *B60W 40/08* (2012.01)
 *B60W 40/10* (2012.01)

(52) U.S. Cl.
 CPC ............ *B60W 30/08* (2013.01); *B60W 40/08* (2013.01); *B60W 40/10* (2013.01);
 (Continued)

(58) Field of Classification Search
 CPC ............ B60R 16/0232; B60R 16/0233; B60R 2021/01013; B60R 2021/0102; B60R 2021/01027; B60R 2021/23192; B60W 30/04; B60W 30/08; B60W 40/08; B60W 2030/041; B60W 2030/043; B60W 2520/125; B60W 2540/01; B60W 2540/049
 See application file for complete search history.

(56) References Cited

U.S. PATENT DOCUMENTS 6,584,388 B2   6/2003   Schubert et al.
12,081,052 B2  9/2024   Fuchs et al.
(Continued)

FOREIGN PATENT DOCUMENTS

| JP | 2002-197569 A | 7/2002 |
| JP | 2017-117194 A | 6/2017 |
| JP | 2019-502588 A | 1/2019 |

OTHER PUBLICATIONS

International Search Report and Written Opinion issued by the International Searching Authority, dated Jan. 25, 2022, for International Patent Application No. PCT/US2021/055803; 13 pages.
(Continued)

*Primary Examiner* — Peter D Nolan
*Assistant Examiner* — Ce Li Li
(74) *Attorney, Agent, or Firm* — Faegre Drinker Biddle & Reath LLP

(57) ABSTRACT

Systems and methods for detecting a vehicle hazardous condition of a recreational vehicle and activating a distress mode of the recreation vehicle in response to detecting the vehicle hazardous condition.

24 Claims, 10 Drawing Sheets

(52) U.S. Cl.
CPC ... *B60W 2520/125* (2013.01); *B60W 2540/01* (2020.02); *B60W 2540/049* (2020.02)

(56) References Cited

U.S. PATENT DOCUMENTS

| | | | | |
|---|---|---|---|---|
| 2002/0075140 | A1* | 6/2002 | Yeh | B60R 21/0133 340/440 |
| 2005/0187687 | A1* | 8/2005 | Geborek | B60R 21/0132 340/440 |
| 2009/0174174 | A1 | 7/2009 | McCoy | |
| 2012/0158249 | A1* | 6/2012 | Xu | B60R 21/0132 701/1 |
| 2012/0271484 | A1* | 10/2012 | Feit | G01S 13/931 701/1 |
| 2012/0313769 | A1 | 12/2012 | Holbert | |
| 2013/0060410 | A1 | 3/2013 | Crain et al. | |
| 2013/0253729 | A1* | 9/2013 | Takahashi | B60R 21/0132 701/1 |
| 2014/0135061 | A1 | 5/2014 | Rousu et al. | |
| 2014/0274226 | A1 | 9/2014 | Pandya et al. | |
| 2014/0300739 | A1* | 10/2014 | Mimar | G06Q 30/0283 348/148 |
| 2015/0127212 | A1* | 5/2015 | Chacon | G01S 19/14 701/32.4 |
| 2015/0151648 | A1 | 6/2015 | Przybylski | |
| 2016/0180721 | A1 | 6/2016 | Otulic | |
| 2016/0207418 | A1 | 7/2016 | Bergstrom et al. | |
| 2016/0214557 | A1* | 7/2016 | Villa | B62D 49/08 |
| 2016/0294942 | A1 | 10/2016 | Tembey et al. | |
| 2017/0015265 | A1* | 1/2017 | Watanabe | B60R 21/0132 |
| 2017/0051697 | A1* | 2/2017 | Campbell | H04W 4/90 |
| 2017/0053461 | A1* | 2/2017 | Pal | G08G 1/012 |
| 2017/0108342 | A1* | 4/2017 | Foreman | G01C 21/3691 |
| 2017/0116796 | A1* | 4/2017 | Kondou | G07C 5/0816 |
| 2017/0166151 | A1* | 6/2017 | Gergely | B60R 21/013 |
| 2018/0101998 | A1 | 4/2018 | Pierce | |
| 2018/0335825 | A1 | 11/2018 | Kim | |
| 2019/0118792 | A1 | 4/2019 | Malone et al. | |
| 2020/0294385 | A1 | 9/2020 | Lowe | |
| 2022/0123570 | A1 | 4/2022 | Fuchs et al. | |

OTHER PUBLICATIONS

International Search Report and Written Opinion received for PCT Patent Application No. PCT/US2021/055880, mailed on Mar. 17, 2022, 13 pages.
Invitation to Pay Additional Fees received for PCT Patent Application No. PCT/US2021/055880, mailed on Dec. 28, 2021, 2 pages.
European Search Report for EP Patent Application No. 21883791.2, Issued on Aug. 22, 2024, 8 pages.
European Search Report for EP Patent Application No. 21883819.1, Issued on Sep. 10, 2024, 9 pages.
International Preliminary Report on Patentability received for PCT Patent Application No. PCT/US2021/055803, mailed on May 4, 2023, 7 pages.
International Preliminary Report on Patentability received for PCT Patent Application No. PCT/US2021/055880, mailed on May 4, 2023, 10 pages.
International Search Report and Written Opinion received for PCT Patent Application No. PCT/US2021/055803, mailed on Jan. 25, 2022, 12 pages.

* cited by examiner

SYSTEMS AND METHODS FOR VEHICLE HAZARDOUS CONDITION DETECTION

RELATED APPLICATION

This application claims the benefit of U.S. Provisional Patent Application No. 63/093,819, filed Oct. 20, 2020, titled VEHICLE COMMUNICATION AND MONITORING SYSTEMS AND METHODS, and U.S. Provisional Patent Application No. 63/165,920, filed Mar. 25, 2021, titled SYSTEMS AND METHODS FOR VEHICLE HAZARDOUS CONDITION DETECTION, the entire disclosures of which are expressly incorporated by reference herein.

TECHNICAL FIELD

The present disclosure relates generally to systems and methods related to vehicle communication and monitoring systems and, more particularly, to a vehicle communication and monitoring system having an alert system for vehicle hazardous condition detection.

BACKGROUND

Recreational vehicles, such as motorcycles, or off-road vehicles such as all-terrain vehicles (ATVs), utility vehicles (UVs), side-by-side vehicles, and snowmobiles, are widely used for recreational purposes. These vehicles might be used on both roads and trails, or only on trails and equipped with alert systems to monitor the recreational vehicles.

It is with respect to these and other general considerations that embodiments have been described. Also, although relatively specific problems have been discussed, it should be understood that the embodiments should not be limited to solving the specific problems identified in the background.

SUMMARY

As set forth above, embodiments provided herein relate to vehicle hazardous condition detection for a recreational vehicle. Exemplary embodiments include but are not limited to the following examples.

In one aspect, a monitoring system for detecting a vehicle hazardous condition of a recreational vehicle includes a processor and memory. The memory includes instructions that when executed by the processor cause the processor to detect whether the recreation vehicle is in a vehicle hazardous condition based at least part on orientation data of the recreation vehicle and activate, in response to a detection of the vehicle hazardous condition, a distress mode of the recreation vehicle to trigger an emergency response.

In some embodiments, the memory may further include instructions that when executed by the processor cause the processor to determine, in response to a detection of the vehicle hazardous condition, a severity level of the vehicle hazardous condition.

In some embodiments, the vehicle hazardous condition may include a vehicle accident, a vehicle rollover, and/or a vehicle fall that poses a potentially hazardous condition for one or more occupants of the recreational vehicle.

In some embodiments, to detect whether the recreation vehicle is in a vehicle hazardous condition based at least part on the orientation data of the recreation vehicle may include to detect a vehicle rollover by determining whether a rate of change in orientation of the vehicle exceeds a rollover threshold value for longer than a predetermined time period.

In some embodiments, to detect whether the recreation vehicle is in a vehicle hazardous condition may include to detect the vehicle hazardous condition based at least part on z-axis acceleration data of the recreation vehicle.

In some embodiments, to detect whether the recreation vehicle is in a vehicle hazardous condition may include to detect the vehicle hazardous condition based at least part on lateral acceleration data of the recreation vehicle.

In some embodiments, the memory may further include instructions that when executed by the processor cause the processor to receive or obtain the vehicle occupant sensor data from one or more occupant monitoring sensors. The one or more occupant monitoring sensors may be configured to generate the vehicle occupant sensor data associated with one or more occupants of the recreational vehicle.

In some embodiments, to detect whether the recreation vehicle is in a vehicle hazardous condition may include to detect the vehicle hazardous condition based at least part on vehicle occupant sensor data of the recreation vehicle from the one or more occupant monitoring sensors.

In some embodiments, the occupant monitoring sensor may include a helmet, a headset, a smart watch, a smart device, and/or any wearable or attachable device that an occupant of the recreational vehicle wears while riding the recreational vehicle.

In some embodiments, the vehicle occupant sensor data may include position and orientation data, heart rate data, temperature data, and/or oxygen level data.

In some embodiments, to activate the distress mode may include at least one of transmit a distress signal to an emergency contact. enable a rider ejection, enable a concussion detection, enable a SOS warning signal, enable a power saving mode, amplify a power level to increase communication channel range, and/or turn off an engine of the recreational vehicle.

In another aspect, a method for detecting a vehicle hazardous condition of a recreational vehicle includes detecting, by a monitoring system of the recreational vehicle, whether the recreational vehicle is in a vehicle hazardous condition based at least part on orientation data of the recreational vehicle, and activating, in response to detecting the vehicle hazardous condition by the monitoring system, a distress mode of the recreation vehicle to trigger an emergency response.

In some embodiments, the method may further include determining, in response to detecting of the vehicle hazardous condition, a severity level of the vehicle hazardous condition.

In some embodiments, wherein the vehicle hazardous condition may include a vehicle accident, a vehicle rollover, and/or a vehicle fall that poses a potentially hazardous condition for one or more occupants of the recreational vehicle.

In some embodiments, wherein detecting whether the recreation vehicle is in a vehicle hazardous condition may include detecting a vehicle rollover of the recreation vehicle by determining whether a rate of change in orientation of the vehicle exceeds a rollover threshold value for longer than a predetermined time period.

In some embodiments, wherein detecting whether the recreation vehicle is in a vehicle hazardous condition may include detecting the vehicle hazardous condition based at least part on z-axis acceleration data of the recreation vehicle.

In some embodiments, wherein detecting whether the recreation vehicle is in a vehicle hazardous condition may include detecting the vehicle hazardous condition based at least part on lateral acceleration data of the recreation vehicle.

In some embodiments, further comprising receiving or obtaining the vehicle occupant sensor data from one or more occupant monitoring sensors, wherein the one or more occupant monitoring sensors may be configured to generate the vehicle occupant sensor data associated with one or more occupant of the recreational vehicle.

In some embodiments, wherein detecting whether the recreation vehicle is in a vehicle hazardous condition may include detecting the vehicle hazardous condition based at least part on vehicle occupant sensor data of the recreation vehicle from the one or more occupant monitoring sensors.

In some embodiment, wherein the occupant monitoring sensor may include a helmet, a headset, a smart watch, a smart device, and/or any wearable or attachable device that an occupant of the recreational vehicle wears while riding the recreational vehicle.

In some embodiments, wherein the vehicle occupant sensor data may include position and orientation data, heart rate data, temperature data, and/or oxygen level data.

In some embodiments, wherein activating the distress mode may include the steps of at least one of transmitting a distress signal to an emergency contact, enabling, by the monitoring system, a rider ejection, enabling, by the monitoring system, a concussion detection, enabling, by the monitoring system, a SOS warning signal, enabling, by the monitoring system, a power saving mode, amplifying, by the monitoring system, a power level to increase communication channel range, and/or turning off, by the monitoring system, an engine of the recreational vehicle.

In some embodiments, wherein activating the distress mode may include the step of turning off, by the monitoring system, an engine of the recreational vehicle.

In some embodiments, wherein activating the distress mode may include the step of transmitting a distress signal to a remote device.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Figure 1:
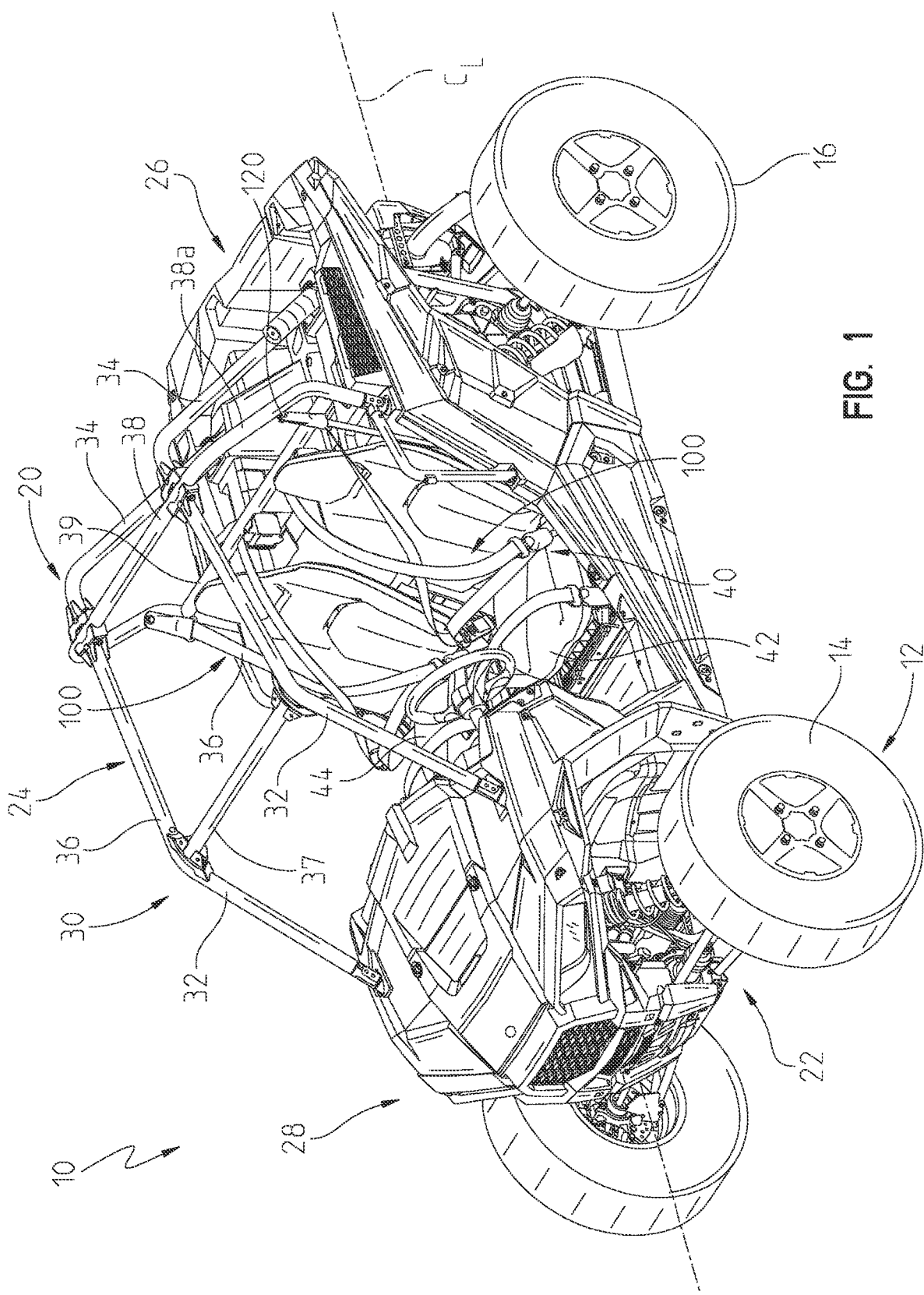
FIG. 1 illustrates a front left perspective view of an exemplary recreational vehicle of the present disclosure.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION OF THE DRAWINGS

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring to FIG. 1, an illustrative embodiment of an exemplary vehicle 10 is shown. The vehicle 10 is configured for off-road conditions. It should be appreciated that the vehicle 10 is an exemplary recreational vehicle, particularly a side-by-side off road vehicle. Exemplary recreational vehicles include snowmobiles, boats, motorcycles, ATVs, utility vehicles, golf carts, and other suitable vehicles. The vehicle 10 includes a plurality of ground-engaging members 12, illustratively front wheels 14 and rear wheels 16. In one embodiment, one or more of the ground-engaging members 12 may be include tracks, such as the Prospector II Tracks available from Polaris Industries Inc., located at 2100 Highway 55 in Medina, MN 55340 such as those shown in U.S. Pat. Nos. 7,673,711 and 10,118,477 or non-pneumatic tires, such as those shown in U.S. Pat. Nos. 8,176,957 and 8,104,524.

The vehicle 10 further includes a chassis or frame assembly 20 supported above a ground surface by ground-engaging members 12. The ground surface may be generally level or undulating dirt, grass, concrete, ceramic, polymeric, or other surface. The frame assembly 20 extends along a longitudinal centerline $C_L$ of the vehicle 10. The frame assembly 20 includes a lower frame assembly 22 and an upper frame assembly 24 extending vertically above lower frame assembly 22. The lower frame assembly 22 supports a rear cargo area 26 and a vehicle body 28, which includes a plurality of body panels. The region bounded by the upper frame assembly 24 and lower frame assembly 22 is referred to as an open-air operator area 30 of vehicle 10. However, in other embodiments, the vehicle 10 includes a closed-air operator area 30. The upper frame assembly 24 includes front upstanding members 32, rear upstanding members 34, longitudinally extending members 36, a front lateral member 37, a rear lateral member 38, and at least one brace 39. In some embodiments, the rear lateral member 38 is continuous with or coupled to intermediate upstanding members 38a.

As shown in FIG. 1, the operator area 30 includes seating 40 for an operator and one or more passengers. Illustratively, the seating 40 includes an operator seat 42 and a passenger seat 44, however, the seating 40 may also include rear seats for additional passengers. Each seat may include a restraint system 100, as described in more detail below. Although only the operator seat 42 and the corresponding restraint system 100 will be discussed in detail, each seat may include a similar restraint system 100 configured to its corresponding seat.

Figure 2:
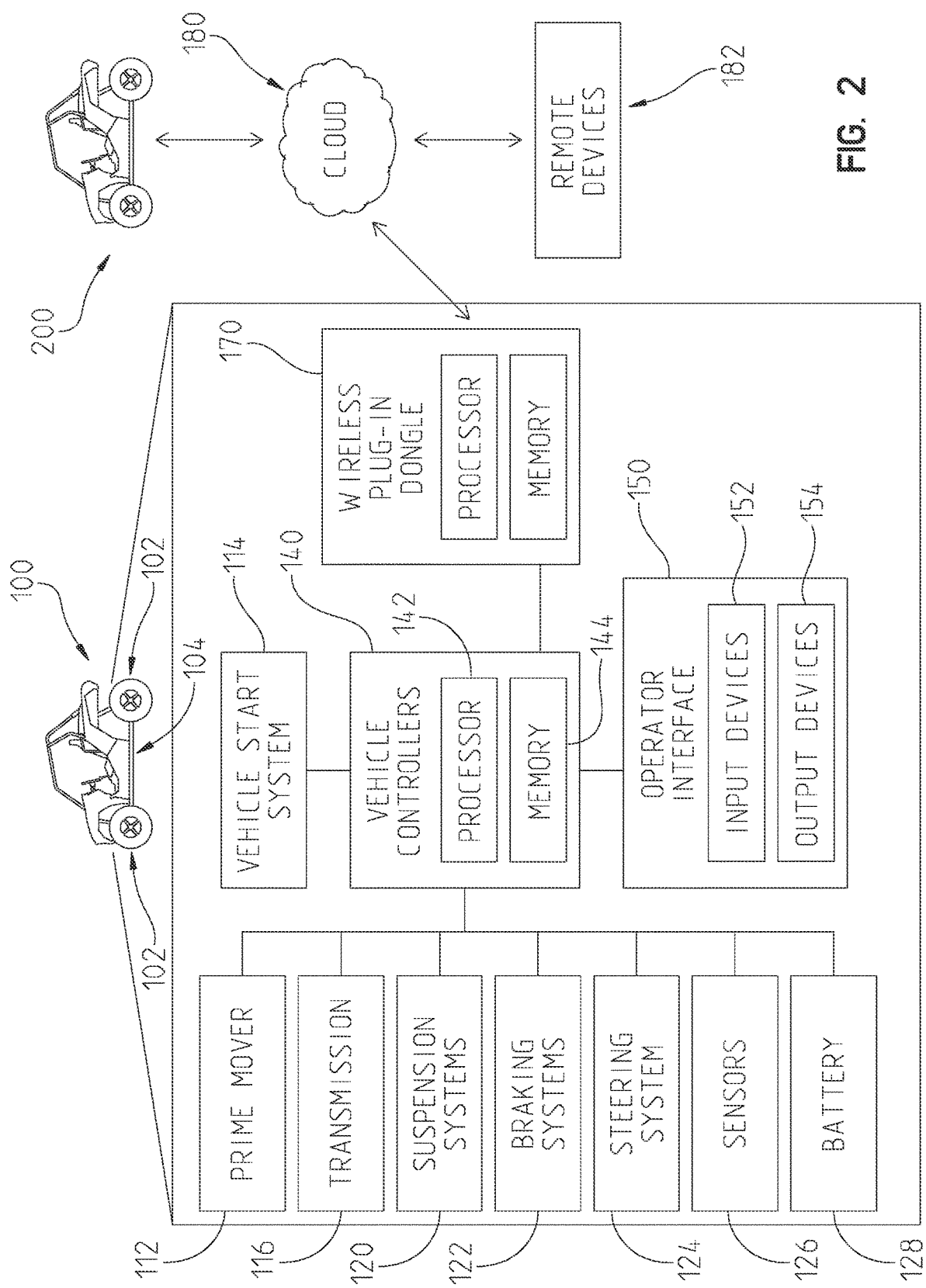
FIGS. 2-5 illustrate an exemplary recreational vehicle of the present disclosure.

Referring to FIG. 2, a vehicle 100 is represented. Vehicle 100 is an exemplary recreational vehicle, particularly a side-by-side off road vehicle. Additional details regarding exemplary embodiments of vehicle 100 may be further configured as shown in U.S. Pat. No. 8,827,028; U.S. patent application Ser. No. 16/458,797, published as U.S. 2020/0164742A1; U.S. patent application Ser. No. 16/244,462, published as U.S. 2019/0210668A1; and/or U.S. patent application Ser. No. 16/861,859, the entire disclosures of which are expressly incorporated by reference herein. Other exemplary recreational vehicles include snowmobiles, boats, motorcycles, ATVs, utility vehicles, golf carts, and other suitable vehicles. Additional exemplary vehicles and display systems are disclosed in U.S. Published Patent Application No. 2018/0257726, filed Mar. 5, 2018, titled TWO-WHEELED VEHICLE; U.S. patent application Ser. No. 16/723,754, filed Dec. 20, 2019, titled SNOWMOBILE STORAGE COMPARTMENT, DISPLAY, ANTENNA, AND BODY TRIM SYSTEM; and U.S. Published Patent Application No. 2017/0334500, filed May 23, 2016, titled DISPLAY SYSTEMS AND METHODS FOR A RECREATIONAL VEHICLE, the entire disclosures of which are expressly incorporated by reference herein.

Recreational vehicle 100 includes a plurality of ground engaging members 102. Exemplary ground engaging members include skis, endless tracks, wheels, and other suitable devices which support vehicle 100 relative to the ground. Recreational vehicle 100 further includes a frame 104 supported by the plurality of ground engaging members 102. In one embodiment, the frame 104 includes cast portions, weldments, tubular components or a combination thereof. In one embodiment, the frame 104 is a rigid frame. In one embodiment, the frame 104 has at least two sections which are moveable relative to each other.

An operator support is supported by the frame 104. Exemplary operator supports include straddle seats, bench seats, bucket seats, and other suitable support members. In addition to operator support, recreational vehicle 100 may further include a passenger support. Exemplary passenger supports include straddle seats, bench seats, bucket seats, and other suitable support members.

A power system is supported by the frame 104 and illustratively includes a prime mover 112 and a transmission 116. The power system provides the motive force and communicates the same to at least one of the ground engagement members 102 to power movement of recreational vehicle 100.

Exemplary prime movers 112 include internal combustion engines, two stroke internal combustion engines, four stroke internal combustion engines, diesel engines, electric motors, hybrid engines, and other suitable sources of motive force. To start the prime mover 112, a vehicle start system 114 is provided. The type of vehicle start system 114 depends on the type of prime mover 112 used. In one embodiment, the prime mover 112 is an internal combustion engine and vehicle start system 114 is one of a pull start system and an electric start system. In one embodiment, the prime mover 112 is an electric motor and vehicle start system 114 is a switch system which electrically couples one or more batteries to the electric motor. In embodiments, vehicle start system includes a key (or key fob).

The transmission 116 is coupled to the prime mover 112. In embodiments, transmission 116 includes a shiftable transmission and a continuously variable transmission ("CVT"). In one arrangement, the CVT is coupled to prime mover 112 and the shiftable transmission is in turn coupled to the CVT. In one embodiment, the shiftable transmission includes a forward high setting, a forward low setting, a neutral setting, a park setting, and a reverse setting. Exemplary CVTs are disclosed in U.S. Pat. Nos. 3,861,229; 6,176,796; 6,120,399; 6,860,826; and 6,938,508, the disclosures of which are expressly incorporated by reference herein. Transmission 116 is further coupled to at least one differential (not shown) which is in turn coupled to at least one ground engaging members 102.

The recreational vehicle 100 further includes a plurality of suspension systems 120 which couple the ground engaging members 102 to frame 104. Exemplary suspension systems are disclosed in U.S. patent application Ser. No. 16/013,210, filed Jun. 20, 2018, titled VEHICLE HAVING SUSPENSION WITH CONTINUOUS DAMPING CONTROL; U.S. patent application Ser. No. 16/529,001, filed Aug. 1, 2019, titled ADJUSTABLE VEHICLE SUSPENSION SYSTEM; U.S. patent application Ser. No. 15/816,368, filed Nov. 17, 2017, titled ADJUSTABLE VEHICLE SUSPENSION SYSTEM; U.S. patent application Ser. No. 16/198,280, filed Nov. 21, 2018, titled VEHICLE HAVING ADJUSTABLE COMPRESSION AND REBOUND DAMPING; U.S. Provisional Application Ser. No. 63/027,833, filed May 20, 2020, titled SYSTEMS AND METHODS OF ADJUSTABLE SUSPENSIONS FOR OFF-ROAD RECREATIONAL VEHICLES; and U.S. Provisional Application Ser. No. 63/053,278, filed Jul. 17, 2020, titled VEHICLE HAVING ADJUSTABLE COMPRESSION AND REBOUND DAMPING, the entire disclosures of which are expressly incorporated by reference herein.

The recreational vehicle 100 further includes a braking system 122. In one embodiment, braking system 122 includes anti-lock brakes. The recreational vehicle 100 further includes a steering system 124. Steering system 124 is coupled to at least one of the ground engagement members 102 to direct recreational vehicle 100. The recreational vehicle 100 further includes a plurality of sensors which monitor various characteristics of vehicle 100 and a battery 128 which provides power to various components of vehicle 100.

Further, the recreational vehicle 100 includes a vehicle controller 140 having at least one processor 142 and at least one associated memory 144. The vehicle controller 140 provides the electronic control of the various components of recreational vehicle 100. Further, vehicle controller 140 is operatively coupled to the plurality of sensors 126 which monitor various parameters of recreational vehicle 100 or the environment surrounding vehicle 100. The vehicle controller 140 performs certain operations to control one or more subsystems of other vehicle components, such as one or more of a fuel system, an air handling system, the CVT, the shiftable transmission, the prime mover 112, the suspensions 120, and other systems. In certain embodiments, the controller 140 forms a portion of a processing subsystem including one or more computing devices having memory, processing, and communication hardware. The controller 140 may be a single device or a distributed device, and the functions of the controller 140 may be performed by hardware and/or as computer instructions on a non-transitory computer readable storage medium, such as memory 144.

The vehicle controller 140 also interacts with an operator interface 150 which includes at least one input device 152 and at least one output device 154. Exemplary input devices 152 include levers, buttons, switches, soft keys, and other suitable input devices. Exemplary output devices include lights, displays, audio devices, tactile devices, and other suitable output devices. An operator may signal to the vehicle controller 140 to alter the operation of one or more systems of the vehicle 100 through the input devices 152.

Further, the vehicle 100 may include a wireless plug-in dongle 170 which is operatively coupled to controller 140. The dongle 170 provides a communication link between vehicle controller 140 and remote storage, illustratively a cloud 180. The dongle may receive information and/or instructions from the cloud for use by vehicle controller 140 and may provide information and/or instructions to remote devices 182 or other vehicles 200 through the cloud 180. Further, the information stored in the cloud 180 may be retrieved through a web interface associated with the vehicle 100. In embodiments, the dongle 170, also referred to as a connectivity module, is powered by the battery 128 of vehicle 100. Processing sequences for controlling the drain of the battery 128 are provided herein.

Figure 3:
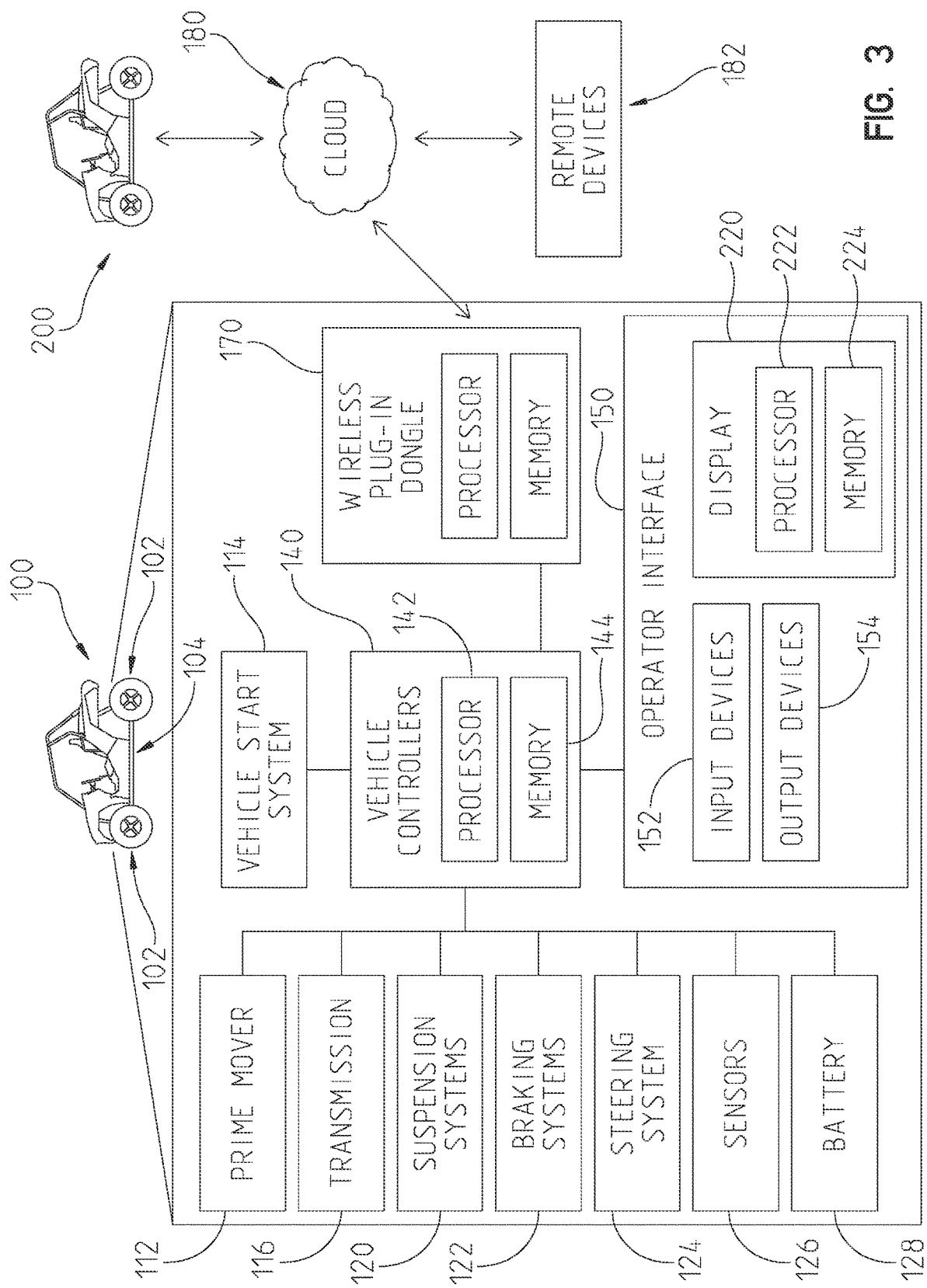

Referring to FIG. 3, another exemplary embodiment of the vehicle 100 is illustrated. As shown in FIG. 3, the vehicle 100 includes a display 220 as part of operator interface 150. The display 220 includes a processor 222 and associated memory 224. In embodiments, the operator interface 150 with the display 220 is an in-vehicle infotainment ("IVI") system. In one example, the display 220 is a touch screen display and operator interface 150 interprets various types of touches to the touch screen display as inputs and controls the content displayed on touch screen display.

Figure 4:
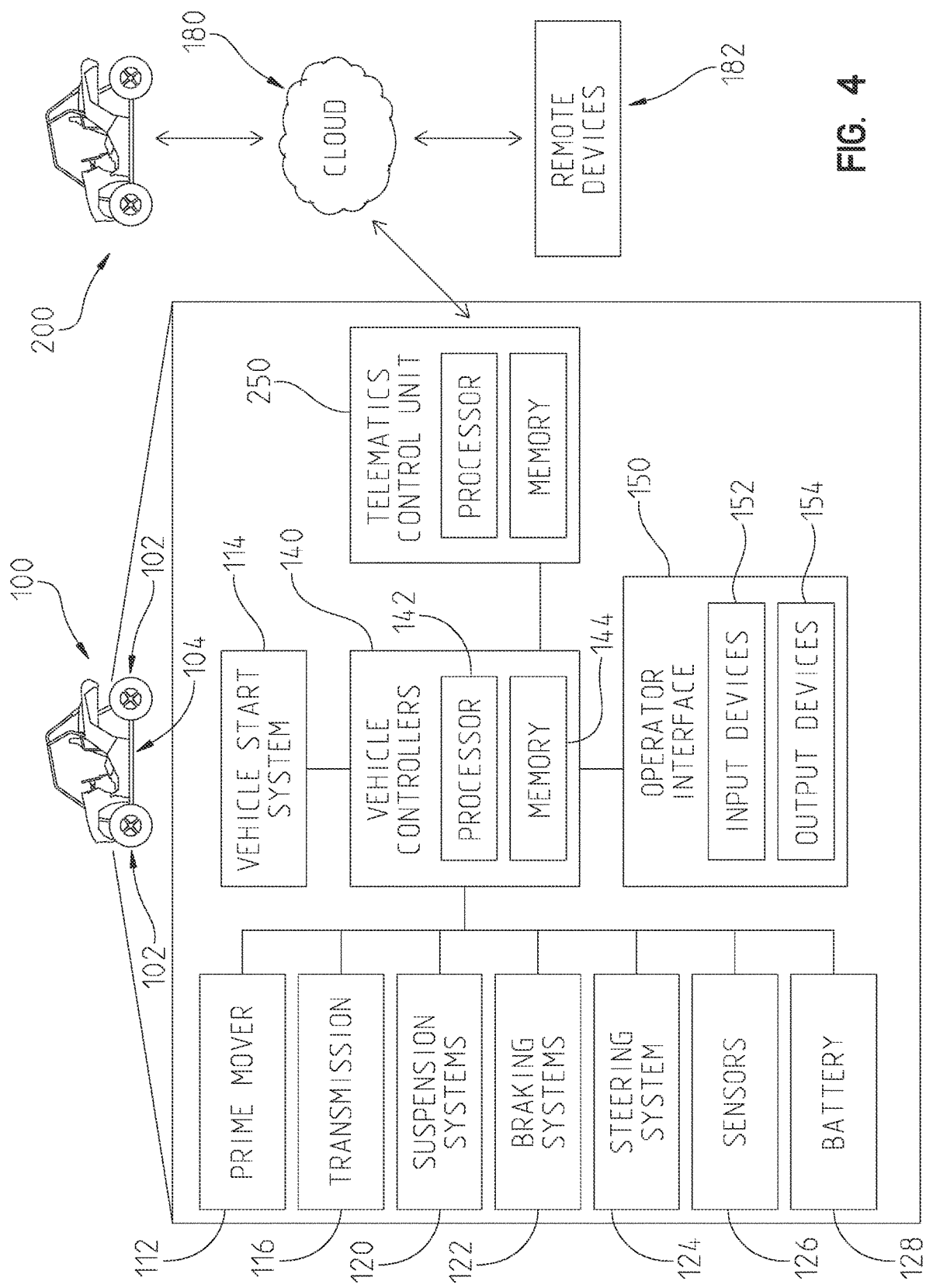

Referring to FIG. 4, a further exemplary embodiment of the vehicle 100 is illustrated. The vehicle 100 of FIG. 4 is the same as the vehicle 100 of FIG. 2 except that the dongle 170 is replaced with a telematics control unit ("TCU") 250. The telematics control unit 250, differs from the dongle 170, in that the telematics control unit 250 is capable of waking up periodically while the vehicle 100 is not running to communicate with the cloud 180, remote devices 182, and/or other vehicles 200. Both the TCU 250 and the dongle 170 have security features enabled for remote notification for a theft alert when the vehicle is not running. In embodiments, the telematics control unit 250, also referred to as a connectivity module, is powered by a battery 128 of the vehicle 100. Processing sequences for controlling the drain of the battery 128 are provided herein.

Figure 5:
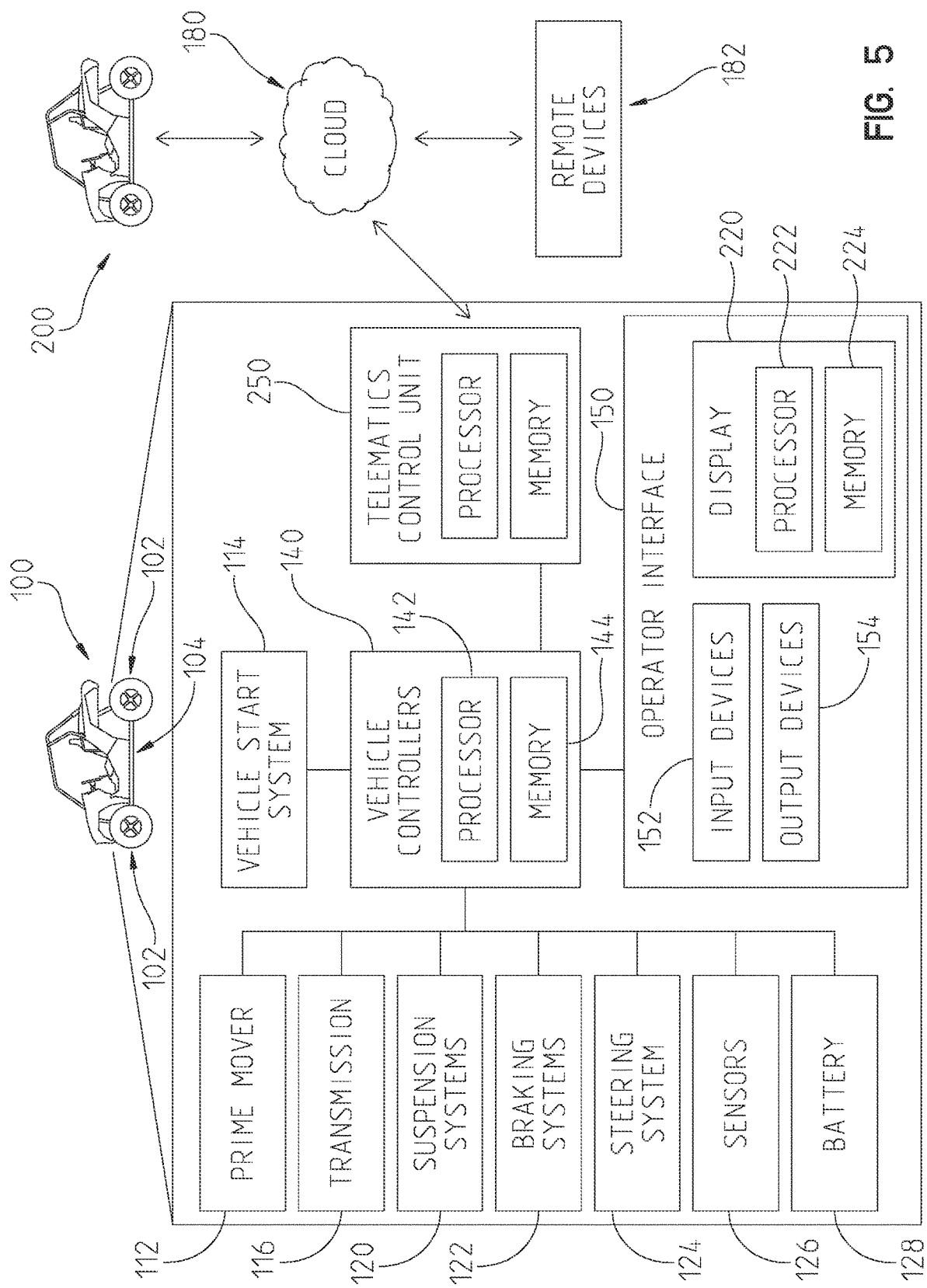

Referring to FIG. 5, a further exemplary embodiment of vehicle 100 is illustrated. The vehicle 100 of FIG. 5 is the same as the vehicle 100 of FIG. 3 except that dongle 170 is replaced with a telematics control unit ("TCU") 250. Telematics control unit 250, differs from dongle 170, in that telematics control unit 250 is capable of waking up periodically while vehicle 100 is not running to communicate with the cloud 180, the remote devices 182, and/or other vehicles 200. In embodiments, the telematics control unit 250, also referred to as a connectivity module, is powered by the battery 128 of the vehicle 100. Processing sequences for controlling the drain of battery 128 are provided herein.

In embodiments, the dongle 170 or TCU 250 includes a location determiner, such as a GPS, to provide an indication of a location of vehicle 100. In embodiments, a location determiner is provided on the vehicle 100 separate from the dongle 170 or TCU 250 to provide an indication of a location of the vehicle 100.

In embodiments, the vehicle 100 includes a separate communication system in addition to or in place of the dongle 170 or TCU 250. In embodiments, exemplary communication systems provide a wireless connection to personal computing devices, such as mobile phones, carried by an operator of the vehicle 100, In embodiments, exemplary communication systems provide a cellular communication device, an RF antenna for direct the vehicle 100 to the vehicle 200 communications, a satellite communication device, and other suitable devices which may connect the vehicle 100 to one or more of vehicle 200, the remote devices 182, and the cloud 180. Exemplary vehicle communication systems and associated processing sequences are disclosed in U.S. patent application Ser. No. 16/234,162, filed Dec. 27, 2018, titled RECREATIONAL VEHICLE INTERACTIVE TELEMETRY, MAPPING AND TRIP PLANNING SYSTEM; U.S. patent application Ser. No. 15/262,113, filed Sep. 12, 2016, titled VEHICLE TO VEHICLE COMMUNICATIONS DEVICE AND METHODS FOR RECREATIONAL VEHICLES; U.S. Pat. No. 10,764,729, titled COMMUNICATION SYSTEM USING VEHICLE TO VEHICLE RADIO AS AN ALTERNATE COMMUNICATION MEANS, filed Dec. 12, 2018; U.S. Published Patent Application No. 2019/0200189, titled COMMUNICATION SYSTEM USING CELLULAR SYSTEM AS AN ALTERNATE TO A VEHICLE TO VEHICLE RADIO, filed Dec. 12, 2018; U.S. Published Patent Application No. 2019/0200173, titled METHOD AND SYSTEM FOR FORMING A DISTANCED-BASED GROUP IN A VEHICLE TO VEHICLE COMMUNICATION SYSTEM, filed Dec. 12, 2018; U.S. Published Patent Application No. 2019/0200188, titled VEHICLE-TO-VEHICLE COMMUNICATION SYSTEM, filed Dec. 12, 2018; U.S. patent application Ser. No. 16/811,865, filed Mar. 6, 2020, titled RECREATIONAL VEHICLE GROUP MANAGEMENT SYSTEM; U.S. Patent Application Ser. No. 63/016,684, filed Apr. 28, 2020, titled SYSTEM AND METHOD FOR DYNAMIC ROUTING; U.S. patent application Ser. No. 16/013,210, filed Jun. 20, 2018, titled VEHICLE HAVING SUSPENSION WITH CONTINUOUS DAMPING CONTROL; and U.S. patent application Ser. No. 15/816,368, filed Nov. 17, 2017, titled VEHICLE HAVING ADJUSTABLE SUSPENSION, the entire disclosures of which are expressly incorporated by reference herein.

Figure 6:
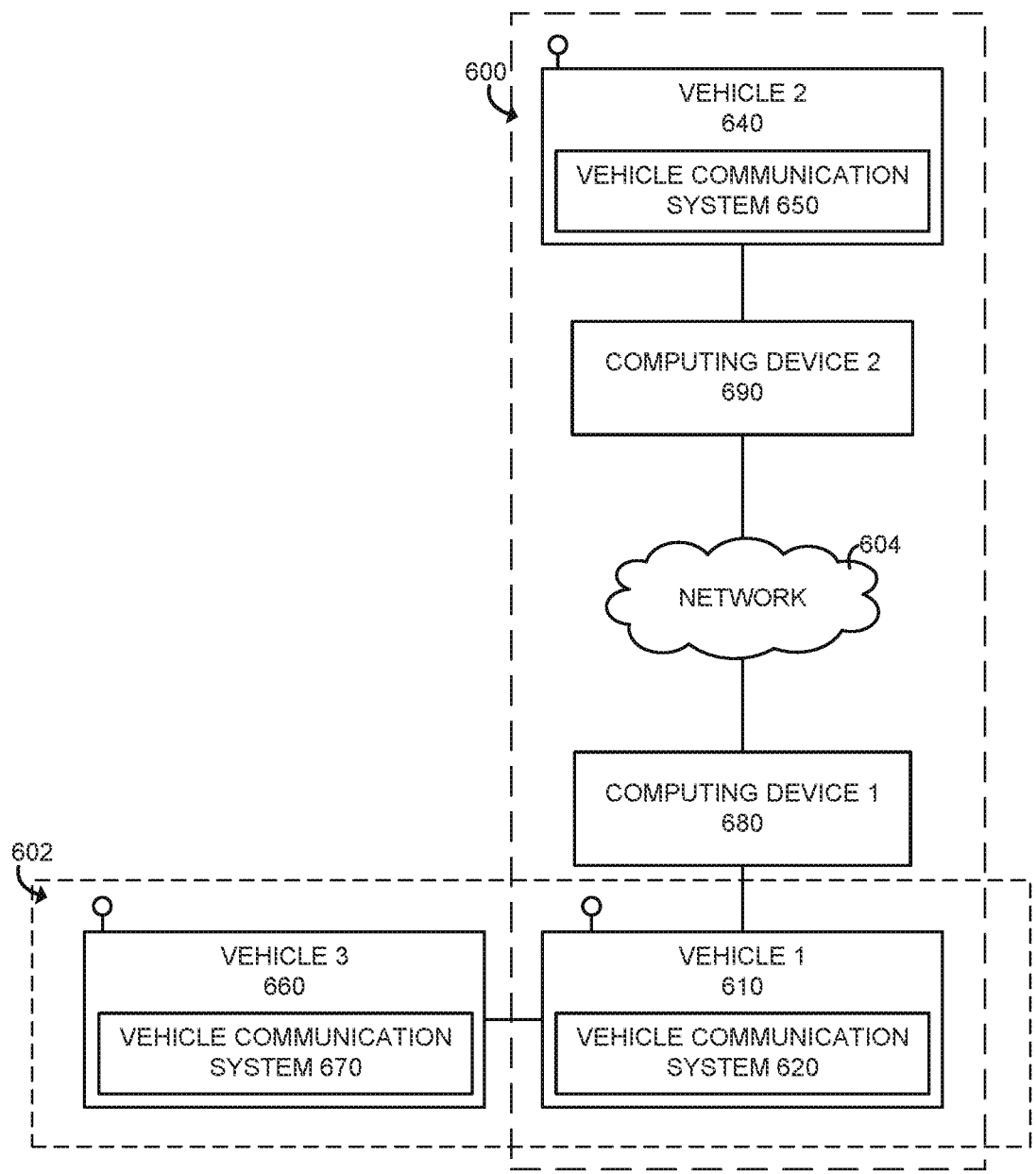
FIG. 6 illustrates various types of communication systems for vehicle communication between recreational vehicles, according to an example of the present disclosure.

Referring now to FIG. 6, various types of communication systems 600, 602 between vehicles (e.g., 610, 640, 660) are illustrated. As shown in FIG. 6, a first vehicle 610 has multiple network capabilities, which allows the first vehicle 610 to communicate with a second vehicle 640 and a third vehicle 660 and thus may function as a bridge device between the second vehicle 640 and the third vehicle 660 that are in different communication systems 600, 602.

For example, the communication system 600 includes the first vehicle 610, a first computing device 680, the second vehicle 640, a second computing device 690, and a network 604. Specifically, the first vehicle 610 is communicatively coupled to the first computing device 680, the second vehicle 640 is communicatively coupled to the second computing device 690, and the first computing device 680 and the second computing device 690 are communicatively coupled to each other via the network 604. In such communication system 600, a vehicle communication system 620 of the first vehicle 610 is linked to the first computing device 680 (e.g., a smart phone, GPS, and/or other devices) through a Bluetooth or other similar communication link to share information and access local and global information network 604. Similarly, a vehicle communication system 650 of the second vehicle 640 is linked to the second computing device 690 (e.g., a smart phone, GPS, and/or other devices) through a Bluetooth or other similar communication link to share information and access local and global information network 604. The network 604 is any suitable type of computer network that functionally couples the first computing device 680 with the second computing device 690.

One example of the communication system 600 is a terrestrial communication system such as a cellular communication system. In such example, the network 604 may a cellular or mobile network. Another example of a communication system 600 is an extraterrestrial communication such as a satellite. The satellite may be a single satellite such as a geostationary satellite or a constellation of satellites such as low earth orbit satellites or middle earth orbit satellites. In such example, the network 604 may a satellite network.

On the other hand, the communication system 602 includes the first vehicle 610 and the third vehicle 660 that is in direct communication with the first vehicle 610. In such system 602, the first vehicle 610 and the third vehicle 660 are communicatively coupled to each other via vehicle radios for wirelessly communicating various types of data between the vehicles 610, 660. Specifically, the vehicle communication system 620 of the first vehicle 610 is in direct communication with a vehicle communication system 670 of the third vehicle 660 via a vehicle-to-vehicle radio such that it does not require the use of communication through a cell or satellite network.

Figure 7:
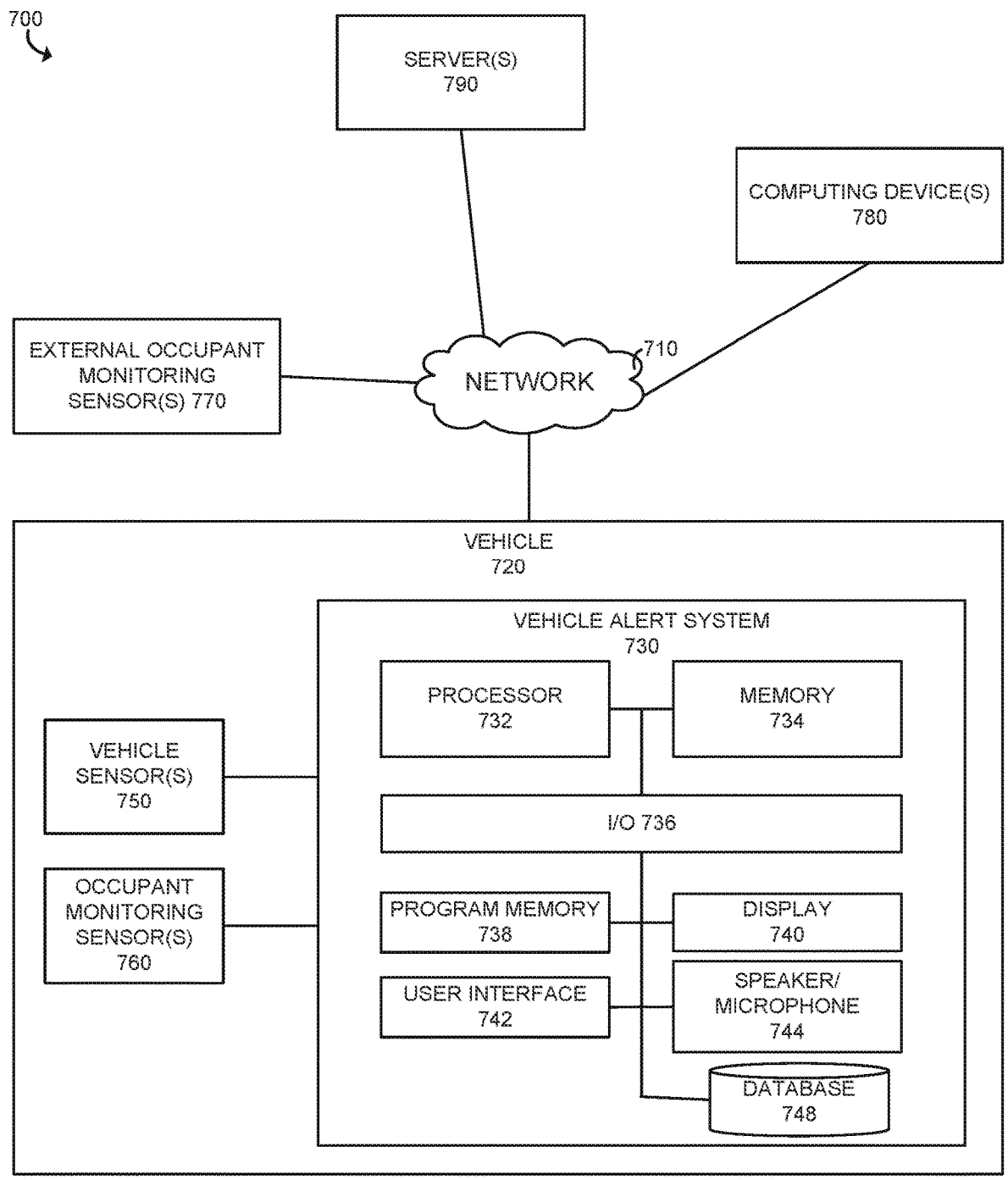
FIG. 7 illustrates a system for vehicle hazardous condition detection including a vehicle having a vehicle alert system, according to an example of the present disclosure.

Referring now to FIG. 7, a block diagram of a computer system 700 for vehicle hazardous condition detection is shown. In the illustrative embodiment, the system 700 includes a vehicle 720 (such as one of the embodiments of vehicle 100, 200, 610, 640, and/or 660 disclosed herein) of a user, one or more external occupant monitoring sensors 770, one or more servers 790, and one or more computing devices 780 associated with the user. In the illustrated embodiment, the one or more external occupant monitoring sensors 770, the one or more computing devices 780, and/or the one or more servers 790 are communicatively coupled to the vehicle 720 via a network 710. The server 790 generally corresponds to one or more computing systems configured to communicate with the vehicle 120 to provide and/or receive data (e.g., GPS data, weather data, and map data). For example, the server 790 may be a service provider computer system associated with the vehicle (e.g., a GPS data provider computer system, weather data provider computer system, or map data provider computer system). It should be appreciated that, in some embodiments, the one or more external occupant monitoring sensors 770, the one or more computing devices 780, and/or the one or more servers 790 may directly communicate with the vehicle 720.

In the illustrative embodiment, the vehicle 720 includes a vehicle alert system 730, one or more vehicle sensors 750, and one or more occupant monitoring sensors 760. The vehicle alert system 730 further includes a processor 732, a memory 734, an input/output (I/O) controller 736 (e.g., a network transceiver), a memory unit 738, a display screen 740, a user interface 742, and a speaker/microphone 744, all of which may be interconnected via one or more address/data bus. Although the I/O controller 736 is shown as a single block, it should be appreciated that the I/O controller 736 may include a number of different types of I/O components. It should be appreciated that the display screen 740 may be a touch screen. The user interface 742 may include one or more input devices that can receive user input (e.g., a touch pad, a keyboard, buttons).

The processor 732 as disclosed herein may be any electronic device that is capable of processing data, for example a central processing unit (CPU), a graphics processing unit (GPU), a system on a chip (SoC), or any other suitable type of processor. It should be appreciated that the various operations of example methods described herein (i.e., performed by the vehicle alert system 730) may be performed by one or more processors 732. The memory 734 may be a random-access memory (RAM), read-only memory (ROM), a flash memory, or any other suitable type of memory that enables storage of data such as instruction codes that the processor 732 needs to access in order to implement any method as disclosed herein. It should be appreciated that although only one processor 732 is shown, the vehicle alert system 730 may include multiple processors 732.

The vehicle alert system 730 may further include a database 748. As used herein, the term "database" may refer to a single database or other structured data storage, or to a collection of two or more different databases or structured data storage components. In the illustrative embodiment, the database 748 is part of the vehicle alert system 730. In some embodiments, the vehicle alert system 730 may access the database 748 via a network such as network 710. The database 748 may store data that is received from and/or to be transmitted to the server(s) 790 and/or the computing device(s) 780.

The vehicle alert system 730 may further include a number of software applications stored in memory unit 738, which may be called a program memory. The various software applications on the vehicle alert system 730 may include specific programs, routines, or scripts for performing processing functions associated with the methods described herein. Additionally, or alternatively, the various software applications on the vehicle alert system 730 may include general-purpose software applications for data processing, database management, data analysis, network communication, web server operation, or other functions described herein or typically performed by a vehicle alert system of a vehicle. The various software applications may be executed on the same computer processor or on different computer processors. Additionally, or alternatively, the software applications may interact with various hardware modules that may be installed within or connected to the vehicle alert system 730. Such modules may implement part of or all of the various exemplary method functions discussed herein or other related embodiments.

The vehicle sensor 750 is any suitable type of sensor that is capable of collecting or generating vehicle sensor data associated with the vehicle 720 and transmitting or otherwise providing an indication of the vehicle sensor data to the vehicle alert system 730. For example, the vehicle sensor 750 may include a vehicle speed sensor, a vehicle orientation sensor, a vehicle position sensor, a vehicle location sensor, a suspension sensor, a brake sensor, a throttle position sensor, a wheel speed sensor, and a gear selection sensor. As described further below, the vehicle sensor data is used to determine whether the vehicle 720 is in a hazardous condition.

The occupant monitoring sensor 760 is any suitable type of sensor that is capable of collecting or generating occupant sensor data associated with one or more users of the vehicle 720 (e.g., any occupants (drivers/riders/passengers) in the vehicle 720) and transmitting the occupant sensor data to the vehicle alert system 730. For example, the occupant monitoring sensor 760 may include an occupant position sensor, a seat sensor, a seat belt sensor, or any device that can detect a safety status of the user during the ride. The occupant sensor data may indicate a number of occupants in the vehicle 720, a position or movement of each occupant during the ride, whether the occupant is wearing a seat belt, and/or a seat belt pressure on each occupant during the ride. As described further below, the occupant sensor data may be used to determine whether the vehicle 720 is in a hazardous condition. The vehicle hazardous condition includes a vehicle accident, a vehicle rollover, a vehicle fall, and/or any other event that poses a potentially hazardous condition for one or more occupants in the vehicle 720.

The computing device 780 may include any existing or future devices capable of collecting, receiving, storing, transmitting, and/or displaying data to and from the user. For example, the computing device may be, but not limited to, a computer, a notebook, a laptop, a mobile device, a smartphone, a tablet, a smart watch, smart glasses, a wearable smart device, or any other suitable computing device that is capable of communicating with the server(s) 790, the vehicle alert system 730, and/or the occupant monitoring sensor(s) 770.

The external occupant monitoring sensor 770 is any suitable type of device that is capable of collecting or generating external occupant sensor data associated with one or more users (e.g., a driver/rider/passenger) of the vehicle 720 and transmitting the external occupant sensor data to the vehicle alert system 730. In the illustrative embodiment, the external occupant monitoring sensor 770 may be communicatively coupled to the vehicle 720 wirelessly (e.g., via Bluetooth, WiFi, or a cellular network) or via a wire. The external occupant monitoring sensor 770 may be any device that is adapted to be worn by or attached to the user when riding the recreational vehicle 720, such as for safety and/or communication. For example, the external occupant monitoring sensor 770 may be a helmet, a headset, a smart watch, a smart device, or any wearable or attachable device that the user may wear during the ride.

In use, the external occupant monitoring sensor 770 is configured to collect or generate external occupant sensor data associated with the user of the vehicle 720 and periodically or continually transmit the external occupant sensor data to the vehicle alert system 730 throughout the ride. In the illustrative embodiment, the vehicle alert system 730 is configured to analyze the external occupant sensor data to determine a status of the user. The status may indicate whether the user is involved in an accident, conscious, or otherwise in a hazardous condition. For example, the external occupant sensor data may be position sensor data, which may be used to determine a direction and/or orientation of the head of the user. If the vehicle alert system 730 determines that the head of the user is at a potentially hazardous position, the vehicle alert system 730 may determine that the vehicle is in hazardous condition and activate a distress mode to trigger one or more safety features or response, which is described further below. As discussed above, the vehicle hazardous condition includes any event that poses a potentially hazardous condition for one or more occupants in the vehicle 720. It should be appreciated that, in some embodiments, the external occupant monitoring sensor 770 may perform the analysis of the collected sensor data to determine the status of the user and transmit the status to the vehicle alert system 730.

The network 710 is any suitable type of computer network that functionally couples the vehicle alert system 730 of the vehicle 720 with at least one external occupant monitoring sensor 770, at least one computing device 780, and/or at least one server 790. The network 710 may include a proprietary network, a secure public internet, a virtual private network and/or one or more other types of networks, such as dedicated access lines, plain ordinary telephone lines, satellite links, cellular data networks, or combinations thereof. In embodiments where the network 710 comprises the Internet, data communications may take place over the network 710 via an Internet communication protocol.

The network 710 may be, or include, any number of different types of communication networks such as, for example, a bus network, a short messaging service (SMS), a local area network (LAN), a wireless LAN (WLAN), a wide area network (WAN), a personal area network (PAN), the Internet, a P2P network, custom-designed communication or messaging protocols, and/or the like. The network 710 may include a combination of multiple networks. It should be appreciated that this diagram is merely an example, which should not unduly limit the scope of the claims.

Figure 8:
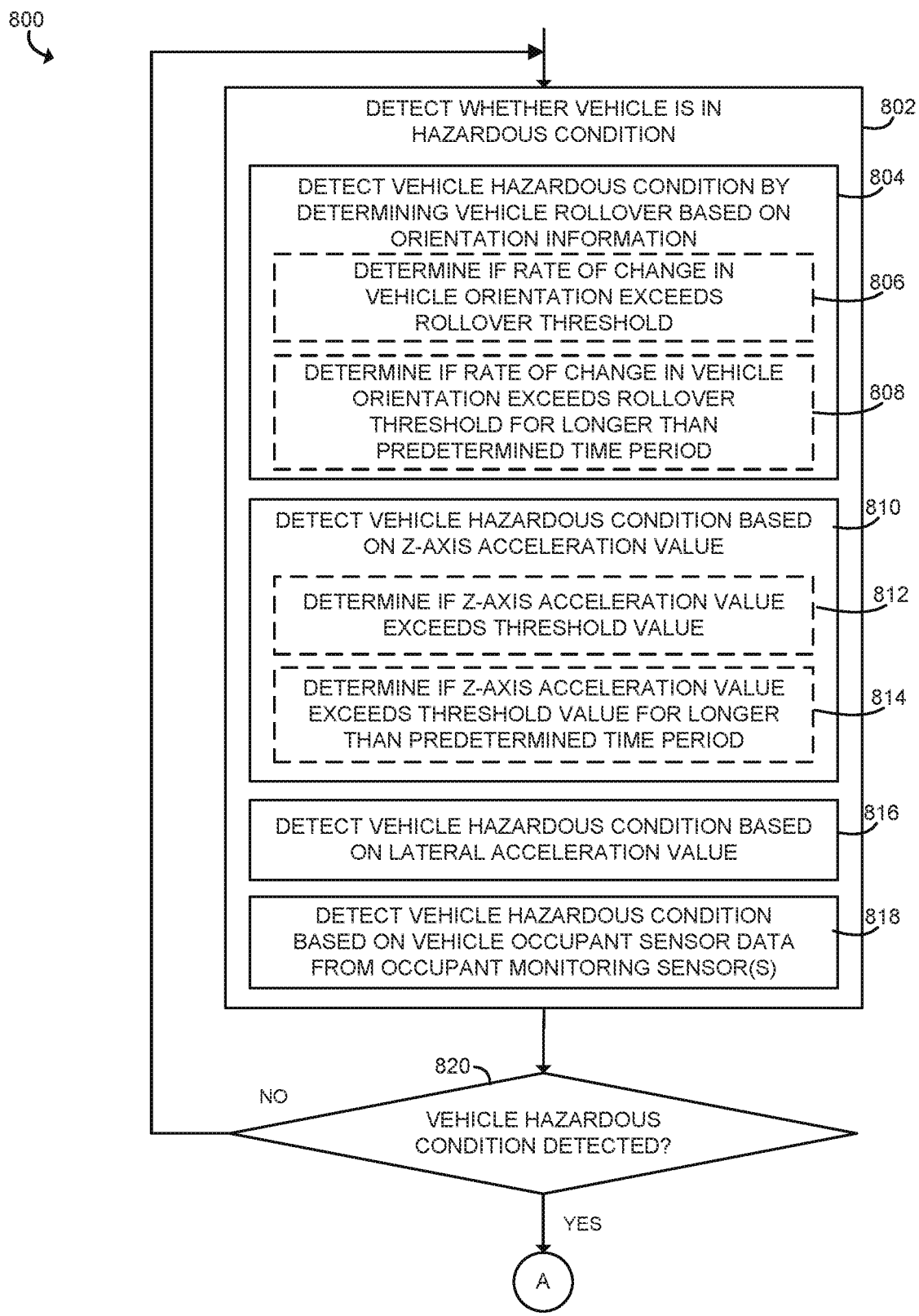
FIGS. 8 and 9 are a flow diagram illustrating a computer-implemented method for detecting one or more vehicle hazardous conditions.
Figure 9:
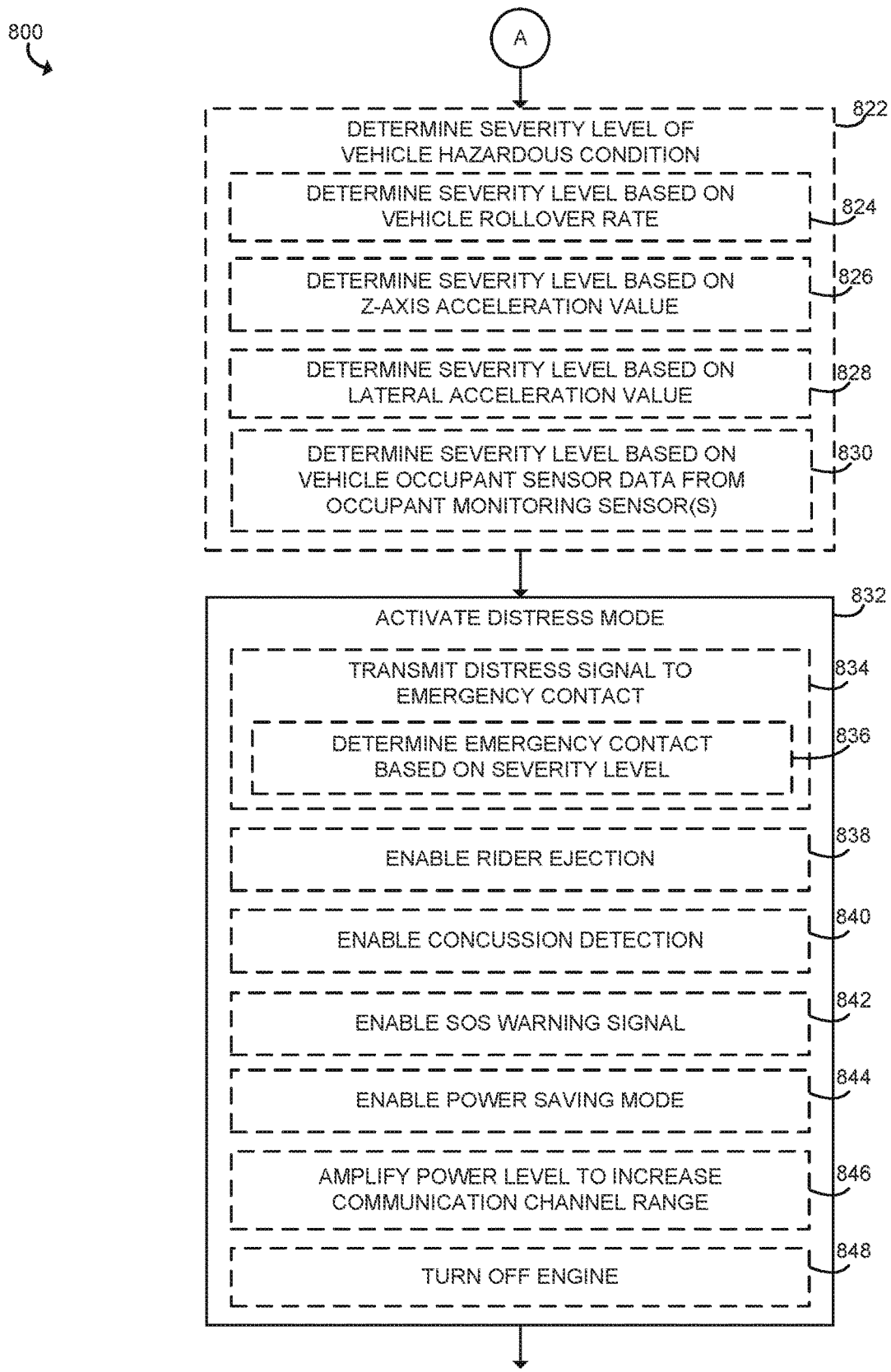

Referring now to FIGS. 8 and 9, a computer-implemented method 800 for detecting a vehicle hazardous condition is shown. In the illustrative embodiment, the method 800 is performed by a vehicle alert system (e.g., 730) of a vehicle (e.g., 720). In block 802, the vehicle alert system 730 determines whether the vehicle 720 is in a potentially hazardous condition. In the illustrative embodiment, the vehicle alert system 730 determines a vehicle rollover based on orientation information (e.g., gyroscope data and acceleration data of the vehicle 720) of the vehicle 720, as indicated in block 804. To do so, in block 806, the vehicle alert system 730 may determine a rate of change in the vehicle orientation based on the orientation information and determine if the rate of change in the orientation of the vehicle 720 exceeds a rollover threshold value. For example, the vehicle alert system 730 may determine that the rate of change in the vehicle orientation exceeds the rollover threshold value if the vehicle 720 is rolling down a hill. The rollover threshold value may be selected anywhere between 100 degrees per second and 150 degrees per second.

Additionally, once the vehicle alert system 730 determines that the rate of change in the orientation of the vehicle 720 exceeds the rollover threshold value (e.g., 100°/s), the vehicle alert system 730 may start a timer to determine whether the rate of change in the orientation of the vehicle 720 continues to exceed the rollover threshold value for longer than a predetermined time period, as indicated in block 808. For example, the vehicle alert system 730 may determine that the vehicle 720 is in a hazardous condition if the rate of change in the orientation of the vehicle 720 remains over 100 degrees per second for longer than 0.75 second.

In some embodiments, different rollover threshold values may be used to identify whether the vehicle 720 has rolled over sideways or pitched forward. For example, the vehicle alert system 730 may determine that the vehicle 720 has rolled over sideways based on the gyroscope data that measures the rate of rotation around the roll axis of the vehicle 720. Additionally, the vehicle alert system 730 may determine that the vehicle 720 has pitched forward based on the gyroscope data that measures the rate of rotation around the pitch axis of the vehicle 720. It should be appreciated that different rollover threshold values may be used to determine whether the vehicle 720 has rolled over sideways or pitched forward. Similarly, the vehicle alert system 730 may differentiate the vehicle being pitched forward from a short jump behavior by adjusting a rollover threshold value.

In some embodiments, the vehicle alert system 730 may further consider historical lateral acceleration data of the vehicle 720 when detecting the vehicle hazardous condition based on the rate of change in the orientation of the vehicle 720. By doing to, the vehicle alert system 730 may be able to distinguish the vehicle rollovers from manual vehicle rotations. For example, the vehicle 720 may be rotated in an angle about the roll axis and/or pitch axis of the vehicle 720 during a vehicle service and repair. In such example, the vehicle alert system 730 may determine that the vehicle 720 is not in a hazardous condition even if the rate of change in the orientation of the vehicle 720 exceeds the rollover threshold if the historical lateral acceleration data of the vehicle 720 indicates that the vehicle 720 had no lateral movement immediately prior to the vehicle rollover is detected.

Additionally, or alternatively, the vehicle alert system 730 may detect a vehicle hazardous condition based on a z-axis acceleration value, as indicated in block 810. The z-axis acceleration value of the vehicle 720 indicates a vehicle acceleration along a z-axis or yaw axis. To do so, in block 812, the vehicle alert system 730 may determine if a z-axis acceleration value of the vehicle 720 exceeds a z-axis acceleration threshold value. Additionally, once the vehicle alert system 730 determines that the z-axis acceleration value of the vehicle 720 exceeds the z-axis acceleration threshold value, the vehicle alert system 730 may start a timer to determine whether the z-axis acceleration value continues to exceed the z-axis acceleration threshold value for longer than a predetermined time period, as indicated in block 814.

For example, if the z-axis acceleration value of the vehicle 720 is between −1 to 0 g, indicating that the vehicle 720 is falling vertically downward, for longer than 10 seconds, the vehicle alert system 730 may determine that the vehicle 720 is in a hazardous condition (e.g., the vehicle 720 fell and has crashed). Likewise, if the z-axis acceleration value of the vehicle 720 is below 0.5 g for longer than 5 seconds, the vehicle alert system 730 determines that the vehicle 720 is in a hazardous condition. However, it should be appreciated that the threshold time period may be anywhere between 5 to 15 seconds, which allows the vehicle alert system 730 to distinguish the vehicle hazardous condition from a jump, which may last approximately around 3 seconds.

In some embodiments, the vehicle alert system 730 may further consider the historical lateral acceleration data of the vehicle 720 when detecting the vehicle hazardous condition based on the z-axis acceleration data. By doing to, the vehicle alert system 730 may be able to distinguish the vehicle free fall from manual vehicle movement along the z-axis. For example, the vehicle 720 may be raised or lowered about the z-axis or yew axis of the vehicle 720 during a vehicle service and repair. In such example, the vehicle alert system 730 may determine that the vehicle 720 is not in a hazardous condition even if the z-acceleration value of the vehicle 720 exceeds the z-axis acceleration threshold if the historical lateral acceleration data of the vehicle 720 indicates that the vehicle 720 had no lateral movement immediately prior to the vehicle free fall is detected.

Additionally, or alternatively, as indicated in block 816, the vehicle alert system 730 may detect a vehicle hazardous condition based on a lateral acceleration value. For example, the vehicle alert system 730 may monitor the lateral acceleration value of the vehicle 720 throughout the ride and continually or periodically determine a change in the lateral acceleration value of the vehicle 720. A sudden decrease in the lateral acceleration value may indicate that the vehicle 720 is in a hazardous condition.

In some embodiments, the vehicle 720 may include a three-axis accelerometer to provide an indicating of forces on the vehicle 720 during operation. Additional sensors may include a brake sensor, a throttle position sensor, a wheel speed sensor, and a gear selection sensor. In such embodiments, each of these sensors may have an output signal coupled to the vehicle alert system 730. This may allow the vehicle alert system 730 to detect whether the vehicle 720 is upside down.

Additionally, or alternatively, the vehicle alert system 730 may detect a vehicle hazardous condition based on vehicle occupant sensor data collected by one or more occupant monitoring sensors (e.g., 760, 770), as indicated in block 818. As shown in FIG. 7, the vehicle alert system 730 is communicatively coupled to the occupant monitoring sensor(s) 760 of the vehicle 720 and the external occupant monitoring sensor(s) 770.

In the illustrative embodiment, the vehicle alert system 730 may receive a first set of vehicle occupant sensor data from the occupant monitoring sensors 760 of the vehicle 720 to determine a safety status of each of the occupants of the vehicle 720. For example, the first set of vehicle occupant sensor data may include a seat pressure on each seat and/or a seat belt pressure on each occupant during the ride. In the illustrative embodiment, the vehicle alert system 730 may continually or periodically determine a number of occupants and a position of each occupant based on the seat pressure. For example, a sudden change in the seat pressure of at least one of the seats of the vehicle may indicate that the vehicle 720 is in a hazardous condition. Additionally, or alternatively, the vehicle alert system 730 may continually or periodically determine the changes in seat belt pressure on each occupant based on the seat belt pressure during the ride. For example, a sudden change in the seat belt pressure of at least one seat belt of the vehicle 720 may indicate that the vehicle 720 is in a hazardous condition.

Additionally, or alternatively, the vehicle alert system 730 may receive a second set of vehicle occupant sensor data from the external occupant monitoring sensors 770 and determine a safety status of each of the occupants of the vehicle 720. As described above, the external occupant monitoring sensor 770 may be embodied as a helmet, a headset, a smart watch, a smart device, or any wearable or attachable device that the user may wear during the ride. For example, the second set of vehicle occupant sensor data may include position and orientation data, heart rate data, temperature data, and/or oxygen level data of the occupant. In the illustrative embodiment, the vehicle alert system 730 may continually or periodically determine changes in the head position and orientation, the heart rate, the temperature, and/or the oxygen level of the respective occupant during the ride based on the second set of vehicle occupant sensor data. If the second set of vehicle occupant sensor data indicates a sudden change in the position and/or orientation of the head of the occupant, the vehicle alert system 730 may determine that the vehicle 720 is in a hazardous condition. Additionally, or alternatively, if the second set of vehicle occupant sensor data indicates that the heart rate, the temperature, and/or the oxygen level of the respective occupant is outside of a respective predefined ideal range, the vehicle alert system 730 may determine that the vehicle 720 is in a hazardous condition.

Subsequently, if the vehicle alert system 730 determines that the vehicle 720 is not in a hazardous condition in block 820, the method 800 loops back to block 802 to continue detecting a vehicle hazardous condition. If, however, the vehicle alert system 730 determines that the vehicle 720 is in a hazardous condition, the method 800 advances to block 822, as shown in FIG. 9.

In some embodiments, the vehicle alert system 730 may determine a severity level of the vehicle hazardous condition, as indicated in block 822. As indicated in block 824, the severity level of the vehicle hazardous condition may be determined based on the vehicle rollover rate. As discussed in block 804, the vehicle rollover may be determined based on the rate of change in the orientation of the vehicle 720. For example, if the vehicle rollover rate is over 100 degrees per second, the vehicle alert system 730 may determine that the severity level of the vehicle hazardous condition is low. If the vehicle rollover rate is over 120 degrees per second, the vehicle alert system 730 may determine that the severity level of the vehicle hazardous condition is medium. If the vehicle rollover rate is over 150 degrees per second, the vehicle alert system 730 may determine that the severity level of the vehicle hazardous condition is high.

Additionally, or alternatively, in some embodiments, the vehicle alert system 730 may monitor and determine a rate of change in the gyroscope data over a predetermined time period once the vehicle rollover is detected. In other words, the vehicle alert system 730 determines how fast the orientation of the vehicle is changing after the vehicle rollover is detected. Additionally, or alternatively, the vehicle alert system 730 may monitor and determine how long the gyroscope data is changing after the vehicle rollover is detected. In other words, the vehicle alert system 730 determines how long the orientation of the vehicle continues to change after the vehicle rollover is detected. The vehicle alert system 730 may determine the severity level of the vehicle hazardous condition based on how fast and/or how long the orientation of the vehicle is changing.

Additionally, or alternatively, the vehicle alert system 730 may determine the severity of the vehicle hazardous condition based on the z-axis acceleration value, as indicated in block 826. For example, the vehicle alert system 730 may determine that the severity level of the vehicle hazardous condition is high if the z-axis acceleration value remains between −1 and 0 g for a first predetermined time period (e.g., longer than 10 seconds). Additionally, the vehicle alert system 730 may determine that the severity level of the vehicle hazardous condition is medium if the z-axis acceleration value remains between −1 and 0 g for a second predetermined time period (e.g., between 8 and 10 seconds). Lastly, the vehicle alert system 730 may determine that the severity level of the vehicle hazardous condition is medium if the z-axis acceleration value remains between −1 and 0 g for a third predetermined time period (e.g., between 5 and 8 seconds).

In another example, the vehicle alert system 730 may determine that the severity level of the vehicle hazardous condition is high if the z-axis acceleration value is below 0.5 g for a first predetermined time period (e.g., longer than 10 seconds). Additionally, the vehicle alert system 730 may determine that the severity level of the vehicle hazardous condition is medium if the z-axis acceleration value is below 0.5 g for a second predetermined time period (e.g., between 8 and 10 seconds). Lastly, the vehicle alert system 730 may determine that the severity level of the vehicle hazardous condition is medium if the z-axis acceleration value is below 0.5 g for a third predetermined time period (e.g., between 5 and 8 seconds).

Additionally, or alternatively, the vehicle alert system 730 may determine the severity of the vehicle hazardous condition based on a rate of change in the lateral acceleration, as indicated in block 828. As discussed above, the vehicle alert system 730 may monitor the lateral acceleration value of the vehicle 720 throughout the ride to continually or periodically determine a change in the lateral acceleration value of the vehicle 720. A sudden decrease in the lateral acceleration may indicate that the vehicle 720 is in a hazardous condition. The vehicle alert system 730 may further determine the severity of the hazardous condition by comparing the rate of change in the lateral acceleration value over a predetermined time period to different threshold values. If the rate of change in the lateral acceleration value exceeds a first threshold, the vehicle alert system 730 may determine that the severity level of the vehicle hazardous condition is low. If the rate of change in the lateral acceleration value exceeds a second threshold, the vehicle alert system 730 may determine that the severity level of the vehicle hazardous condition is medium. Lastly, if the rate of change in the lateral acceleration value exceeds a third threshold, the vehicle alert system 730 may determine that the severity level of the vehicle hazardous condition is high.

Additionally, or alternatively, the vehicle alert system 730 may determine the severity level of the vehicle hazardous condition based on the vehicle occupant sensor data (e.g., from the occupant monitoring sensor(s) 760 of the vehicle 720 and/or the external occupant monitoring sensor(s) 770), as indicated in block 830. As discussed above, the vehicle occupant sensor data may include the heart rate data, the temperature data, and/or the oxygen level data of the occupant of the vehicle 720. In such embodiments, the vehicle alert system 730 may determine that the severity level of the vehicle hazardous condition is high if the heart rate falls below a predefined threshold value and/or the rate of change in the heart rate drops or increases dramatically beyond the normal range. Additionally, or alternatively, the vehicle alert system 730 may determine that the severity level of the vehicle hazardous condition is high if the temperature of the occupant is outside of the normal range and/or the rate of change in the temperature drops or increases beyond the normal range. Additionally, or alternatively, the vehicle alert system 730 may determine that the severity level of the vehicle hazardous condition is high if the oxygen level of the occupant is outside of the normal range and/or the rate of change in the oxygen level drops beyond the normal range.

Subsequently, in response to detecting the vehicle hazardous condition, the vehicle alert system 730 activates a distress mode of the vehicle 720, as indicated in block 832. To do so, in block 834, the vehicle alert system 730 may transmit a distress signal to a remote device to contact an emergency contact (e.g., through a mobile device). In some embodiments, the vehicle alert system 730 may determine the emergency contact based on the severity level of the vehicle hazardous condition, as indicated in block 836. It should be appreciated that the emergency contact for a different severity level may be customized by the user. For example, if the vehicle alert system 730 determines that the severity level of the vehicle hazardous condition is low, the vehicle alert system 730 may contact the vendor service (e.g., Polaris Service). If the vehicle alert system 730 determines that the severity level is medium, the vehicle alert system 730 may contact the "friends and family" indicated by the user. For example, vehicle alert systems 730 may contact other riders in a group that the user belongs to, such as the groups discussed in U.S. patent application Ser. No. 16/811,865, titled RECREATIONAL VEHICLE GROUP MANAGEMENT SYSTEM, the entire disclosure of which is expressly incorporated by reference herein. Lastly, if the vehicle alert system 730 determines that the severity level is high, the vehicle alert system 730 may contact the emergency service (e.g., 911).

Additionally, or alternatively, in block 838, the vehicle alert system 730 may enable a rider ejection to eject the occupant(s) from the vehicle seat(s) in response to detecting the vehicle hazardous condition. For example, the vehicle alert system 730 may propel the seat(s) out of the vehicle 720 to rescue the occupant(s) of the seat(s) of the vehicle 720 if the vehicle alert system 730 determines that the vehicle hazardous condition is severe. In some embodiments, the ejection seat may deploy a parachute.

Additionally, or alternatively, once the vehicle hazardous condition is detected, the vehicle alert system 730 may enable a concussion detection to determine if one or more occupants of the vehicle 720 is conscious, as indicated in block 840. For example, the vehicle alert system 730 may determine whether the user is conscious based on the vehicle occupant sensor data (e.g., the position, orientation, or movement of the head of the occupant, the heart rate, the temperature, and/or the oxygen level of the occupant).

Figure 10:
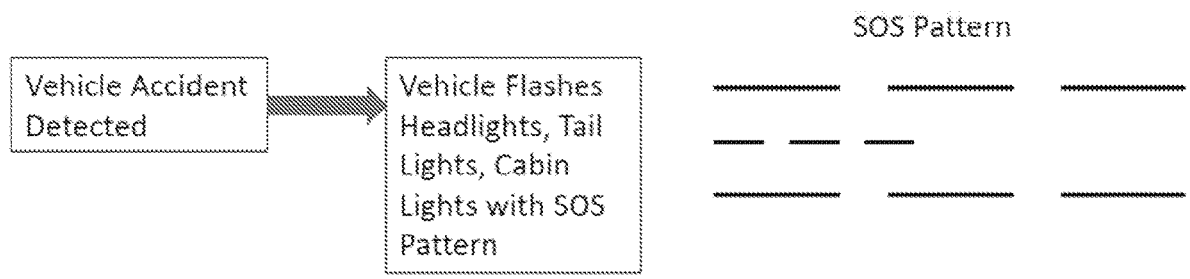
FIG. 10 illustrates an exemplary vehicle feature activated by the vehicle alert system of FIG. 7 in response to detecting a vehicle hazardous condition.

Additionally, or alternatively, in block 842, the vehicle alert system 730 may enable a SOS warning signal in response to detecting the vehicle hazardous condition. In some embodiments, the SOS warning signal may include visual SOS warning light that may be projected via the vehicle on boards lights (e.g., headlights, tail lights, and/or cabin lights). For example, the SOS warning light may have a unique light pattern as shown in FIG. 10, which can be easily perceived by other people (e.g., riders of other vehicles) as a SOS signal. Additionally, or alternatively, in some embodiments, the vehicle alert system 730 may include audible SOS warning sound, which can be easily recognized by people other people (e.g., riders of other vehicles) as a SOS signal.

Additionally, or alternatively, in some embodiments, the vehicle alert system 730 may transmit a SOS warning signal to other vehicles that are in vicinity of the vehicle 720 notifying other riders that the vehicle 720 is in a hazardous condition and needs help. In such embodiments, an SOS icon indicator may be displayed on a display screen of the other vehicles in response to receiving the SOS warning signal. An exemplary SOS icon indicator includes a flashing icon and/or changing a color of an icon, such as from blue to red.

Additionally, or alternatively, in block 844, the vehicle alert system 730 may enable a power saving mode in response to detecting the vehicle hazardous condition to keep the accessory power on as long as possible. For example, the accessory power may be needed to keep the vehicle alert system 730 running to continue transmitting the SOS warning signal.

Additionally, or alternatively, in response to detecting the vehicle hazardous condition, the vehicle alert system 730 may amplify a power level of a communication system of the vehicle 720 to increase the communication range of the vehicle alert system 730, as indicated in block 846. For example, the SOS warning signal may be broadcasted at a higher power compared to the regular vehicle-to-vehicle radio communications. The increase in the communication range allows the vehicle alert system 730 to communicate with a receiver (e.g., other vehicle) that is located at a further distance. In some embodiments, the SOS warning signal may be broadcasted using another frequency channel with amplified power that is different from the regular vehicle-to-vehicle radio communication channel.

Additionally, or alternatively, in block 848, the vehicle alert system 730 may turn off the vehicle engine in response to detecting the vehicle hazardous condition. In some embodiments, the vehicle alert system 730 may determine the oil pressure when the vehicle hazardous condition is detected. If the vehicle alert system 730 determines that the oil pressure is outside of the ideal range (e.g., 25-65 PSI), the vehicle alert system 730 may transmit a signal to turn off the vehicle engine to protect it from being damaged. In some embodiments, the vehicle alert system 730 may automatically turn off the engine if the vehicle alert system 730 determines that the vehicle hazardous condition is severe. Additionally, or alternatively, in some embodiments, the vehicle may wirelessly receive command (e.g., via the TCU) to turn off the engine through a mobile device and/or a dongle (e.g., the dongle 170).

As described above, the TCU is capable of waking up periodically while the vehicle is not running to communicate with other vehicles, a server (e.g., the cloud 180), and/or remote devices (e.g., remote devices 182). In some embodiments, the TCU may remain turned on while the rest of the vehicle is off. This allows the vehicle to continue to send a SOS message through a controller area network (CAN).

It should be appreciated that, in some embodiments, the user (e.g., an occupant, rider, driver, or passenger) of the vehicle 720 may manually disable the distress mode. It should also be appreciated that, in some embodiments, the user may customize which SOS features of the vehicle 702 to activate or enable when the vehicle hazardous condition is detected.

In some embodiments, the vehicle alert system 730 may choose to activate certain features of the distress mode of the vehicle 720 based on the type and/or the severity level of the vehicle hazardous condition. Additionally, or alternatively, in some embodiments, in response to determining that the vehicle is in a hazardous condition, the vehicle alert system 730 may cause one or more features of the distress mode of the vehicle 720 to be performed by a mobile device of the user and/or one or more wearable devices (e.g., the external occupant monitoring sensor 770) of the user. As described above, the external occupant monitoring sensor 770 may be embodied as a helmet, a headset, a smart watch, a smart device, or any wearable or attachable device that the user may wear during the ride.

Additionally, or alternatively, in some embodiments, in response to the distress mode being activated, the vehicle alert system 730 may track the location of the user if the user exits the vehicle and may transmit an updated location of the user to an emergency contact (e.g., the vendor service, the emergency contact indicated by the user, other riders in the group that the user belongs to, or the emergency service) of the user. For example, the vehicle alert system 730 may determine that the user is moving away from the vehicle and track the location of the user based on a location of the mobile device of the user and/or a location of one or more wearable devices (e.g., the external occupant monitoring sensor 770) of the user. In some embodiments, if the user exits the vehicle, the user may be tracked by one or more other vehicles in a group that the user belongs to and/or in proximity that have been alerted to the distress. In such embodiments, the location of the user may be displayed on a display of the other vehicle and/or a mobile device of a driver associated with the other vehicle.

Additionally, or alternatively, in some embodiments, when the vehicle alert system 730 determines that the user exited the vehicle after the distress mode is activated, the vehicle alert system 730 may relay communications to the mobile device of the user and/or one or more wearable devices (e.g., the external occupant monitoring sensor 770) of the user. For example, if the vehicle alert system 730 determines that the user is moving away from the vehicle after the distress mode is activated, the vehicle alert system 730 may relay future communication with the emergency contact to the user's mobile device and/or the one or more wearable devices of the user.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A monitoring system for detecting a vehicle hazardous condition of a recreational vehicle, the monitoring system comprising:
a processor; and
memory comprising instructions that when executed by the processor cause the processor to:
obtain vehicle occupant sensor data associated with one or more occupants of the recreational vehicle;
detect whether the recreational vehicle is in a vehicle hazardous condition based at least part on:
historical lateral acceleration data, from a first period of time, that indicates preceding lateral movement of the recreational vehicle,
orientation data, from a second period of time starting after a start of the first period of time, of the recreational vehicle, and
the occupant sensor data; and
activate, in response to a detection of the vehicle hazardous condition, a distress mode of the recreational vehicle to trigger an emergency response.

2. The monitoring system of claim 1, wherein the memory further comprising instructions that when executed by the processor cause the processor to:
determine, in response to a detection of the vehicle hazardous condition, a severity level of the vehicle hazardous condition.

3. The monitoring system of claim 1, wherein the vehicle hazardous condition includes a vehicle accident, a vehicle rollover, and/or a vehicle fall that poses a potentially hazardous condition for one or more occupants of the recreational vehicle.

4. The monitoring system of claim 1, wherein to detect whether the recreational vehicle is in a vehicle hazardous condition based at least part on the orientation data of the recreational vehicle includes to detect a vehicle rollover by determining whether a rate of change in orientation of the vehicle exceeds a rollover threshold value for longer than a predetermined time period.

5. The monitoring system of claim 1, wherein to detect whether the recreational vehicle is in a vehicle hazardous condition includes to detect the vehicle hazardous condition based at least part on z-axis acceleration data of the recreational vehicle.

6. The monitoring system of claim 1, wherein the vehicle occupant sensor data is obtained from one or more occupant monitoring sensors of the recreational vehicle.

7. The monitoring system of claim 1, wherein the occupant monitoring sensor includes a helmet, a headset, a smart watch, a smart device, and/or any wearable or attachable device that an occupant of the recreational vehicle wears while riding the recreational vehicle.

8. The monitoring system of claim 1, wherein the vehicle occupant sensor data includes position and orientation data, heart rate data, temperature data, and/or oxygen level data.

9. The monitoring system of claim 1, wherein to activate the distress mode includes at least one of:
transmit a distress signal to an emergency contact;
enable a rider ejection;
enable a concussion detection;
enable a SOS warning signal;
enable a power saving mode;
amplify a power level to increase communication channel range; and/or
turn off an engine of the recreational vehicle.

10. The monitoring system of claim 1, wherein the memory further comprises instructions that, when executed by the processor, cause the processor to determine whether an occupant of the vehicle is conscious based on the vehicle occupant sensor data.

11. The monitoring system of claim 1, wherein the occupant sensor data corresponds to a period of time prior to detection of the vehicle hazardous condition.

12. A method for detecting a vehicle hazardous condition of a recreational vehicle, the method comprising:
obtaining vehicle occupant sensor data associated with one or more occupants of the recreational vehicle;
detecting, by a monitoring system of the recreational vehicle, whether the recreational vehicle is in a vehicle hazardous condition based at least part on:
historical lateral acceleration data, from a first period of time, that indicates preceding lateral movement of the recreational vehicle,
orientation data, from a second period of time starting after a start of the first period of time, of the recreational vehicle, and
the occupant sensor data; and
activating, in response to detecting the vehicle hazardous condition by the monitoring system, a distress mode of the recreational vehicle to trigger an emergency response.

13. The method of claim 12, further comprising determining, in response to detecting of the vehicle hazardous condition, a severity level of the vehicle hazardous condition.

14. The method of claim 12, wherein the vehicle hazardous condition includes a vehicle accident, a vehicle rollover, and/or a vehicle fall that poses a potentially hazardous condition for one or more occupants of the recreational vehicle.

15. The method of claim 12, wherein detecting whether the recreational vehicle is in a vehicle hazardous condition includes detecting a vehicle rollover of the recreational vehicle by determining whether a rate of change in orientation of the vehicle exceeds a rollover threshold value for longer than a predetermined time period.

16. The method of claim 12, wherein detecting whether the recreational vehicle is in a vehicle hazardous condition includes detecting the vehicle hazardous condition based at least part on z-axis acceleration data of the recreational vehicle.

17. The method of claim 12, wherein the vehicle occupant sensor data is obtained from one or more occupant monitoring sensors of the recreational vehicle.

18. The method of claim 12, wherein the occupant monitoring sensor data is obtained from at least one of a helmet, a headset, a smart watch, a smart device, and/or any wearable or attachable device that an occupant of the recreational vehicle wears while riding the recreational vehicle.

19. The method of claim 12, wherein the vehicle occupant sensor data includes position and orientation data, heart rate data, temperature data, and/or oxygen level data.

20. The method of claim 12, wherein activating the distress mode includes the steps of at least one of:
transmitting a distress signal to an emergency contact;
enabling, by the monitoring system, a rider ejection;
enabling, by the monitoring system, a concussion detection;

enabling, by the monitoring system, a SOS warning signal;
enabling, by the monitoring system, a power saving mode;
amplifying, by the monitoring system, a power level to increase communication channel range; and/or
turning off, by the monitoring system, an engine of the recreational vehicle.

21. The method of claim 12, wherein activating the distress mode includes the step of turning off, by the monitoring system, an engine of the recreational vehicle.

22. The method of claim 21, wherein activating the distress mode includes the step of transmitting a distress signal to a remote device.

23. The method of claim 12, further comprising determining whether an occupant of the vehicle is conscious based on the vehicle occupant sensor data.

24. The method of claim 12, the occupant sensor data corresponds to a period of time prior to detection of the vehicle hazardous condition.

* * * * *